(12) United States Patent
Goodwin

(10) Patent No.: US 8,685,134 B2
(45) Date of Patent: Apr. 1, 2014

(54) HIGH BIOAVAILABILITY PHOSPHORUS

(75) Inventor: Mark Goodwin, Winnipeg (CA)

(73) Assignee: Wolf Trax Inc., Winnipeg, Manitoba (CA)

( * ) Notice: Subject to any disclaimer, the term of this patent is extended or adjusted under 35 U.S.C. 154(b) by 223 days.

(21) Appl. No.: 13/322,516

(22) PCT Filed: May 25, 2010

(86) PCT No.: PCT/CA2010/000765
§ 371 (c)(1),
(2), (4) Date: Nov. 25, 2011

(87) PCT Pub. No.: WO2010/135814
PCT Pub. Date: Dec. 2, 2010

(65) Prior Publication Data
US 2012/0073341 A1    Mar. 29, 2012

Related U.S. Application Data

(60) Provisional application No. 61/180,966, filed on May 26, 2009.

(51) Int. Cl.
- B32B 9/00 (2006.01)
- A01C 1/06 (2006.01)
- C05B 7/00 (2006.01)

(52) U.S. Cl.
USPC ............ 71/34; 47/57.6; 71/53; 71/64.07; 428/403

(58) Field of Classification Search
USPC ............ 71/32–63, 64.07; 47/57.6; 428/403
See application file for complete search history.

(56) References Cited

U.S. PATENT DOCUMENTS

| | | | |
|---|---|---|---|
| 4,209,316 A | | 6/1980 | McDaniel et al. |
| 6,776,816 B1 | * | 8/2004 | Ringelberg et al. ............... 71/6 |
| 7,789,932 B2 | * | 9/2010 | Anderson et al. ............... 71/34 |
| 2002/0011088 A1 | * | 1/2002 | Peacock et al. ............ 71/64.02 |
| 2006/0230798 A1 | * | 10/2006 | McConchie et al. ........... 71/33 |
| 2011/0230353 A1 | * | 9/2011 | Anderson et al. ............ 504/320 |

* cited by examiner

Primary Examiner — Wayne Langel
(74) Attorney, Agent, or Firm — Michael R. Williams; Ade & Company Inc

(57) ABSTRACT

The efficiency of applied phosphorus can be improved by applying phosphorus as a coating onto plant growth (roots and shoots) or by applying phosphorus as a coating on prills or granules of other forms of fertilizers. The composition comprises (a) monoammonium phosphate, (b) struvite and (c) magnesium sulphate. The first two ingredients ensure that there is a source of rapidly available phosphorus (MAP) and a source of more slowly available phosphorus (STRUV). The third ingredient is to provide a source of sulphate which will, in the area surrounding the coated product following application thereof to the soil, act to stop ambient calcium from reacting with the phosphate thereby rendering it inactive.

20 Claims, 4 Drawing Sheets

HIGH BIOAVAILABILITY PHOSPHORUS

PRIOR APPLICATION INFORMATION

The instant application claims the benefit of U.S. Provisional Patent Application 61/180,966, filed May 26, 2009.

BACKGROUND OF THE INVENTION

As is well known to those of skill in the art, phosphorus (P) is an essential element for crop growth. In the past, applications of phosphorus made by growers has been only about 20 percent efficient (specifically, only 20 percent of the applied phosphorus is available to the crop in the year of treatment). This level of efficiency is attained through use of standard application techniques that call for applying the product in large granules (1 mm diameter and up). It is of note that fines are only present if the product is mishandled and if present ever or at all, it is considered undesirable (dusty).

SUMMARY OF THE INVENTION

According to an aspect of the invention, there is provided a composition comprising monoammonium phosphate, struvite and magnesium sulphate.

According to another aspect of the invention, there is provided a method of improving plant growth comprising:
  applying a composition comprising monoammonium phosphate, struvite and magnesium sulphate to a seed, prill or fertilizer granule, thereby producing a coated product; and
  applying the coated product to soil comprising at least one growing plant,
  wherein the coated product results in improved growth of a plant due to increased phosphorous uptake by said plant compared to the growth of a similar plant supplied a similar, uncoated product.

According to an aspect of the invention, there is provided a composition comprising: 30 to 40 percent monoammonium phosphate, 30 to 40 percent struvite and 25 to 35 percent magnesium sulphate. The composition may include 1-4% acidic surfactant. The composition may include 1-3% drying agent, for example, a silica-based drying agent. The phosphorus source may be in the form of ground particles smaller than 150 mesh.

According to a another aspect of the invention, there is provided a method of improving plant growth comprising: applying a composition comprising monoammonium phosphate, struvite and magnesium sulphate to a seed, prill or fertilizer granule, thereby producing a coated product; and applying the coated product to soil wherein the coated product results in improved growth of a plant due to increased phosphorous uptake by said plant compared to the application of a similar, uncoated product.

DESCRIPTION OF THE PREFERRED EMBODIMENTS

Figure 1:
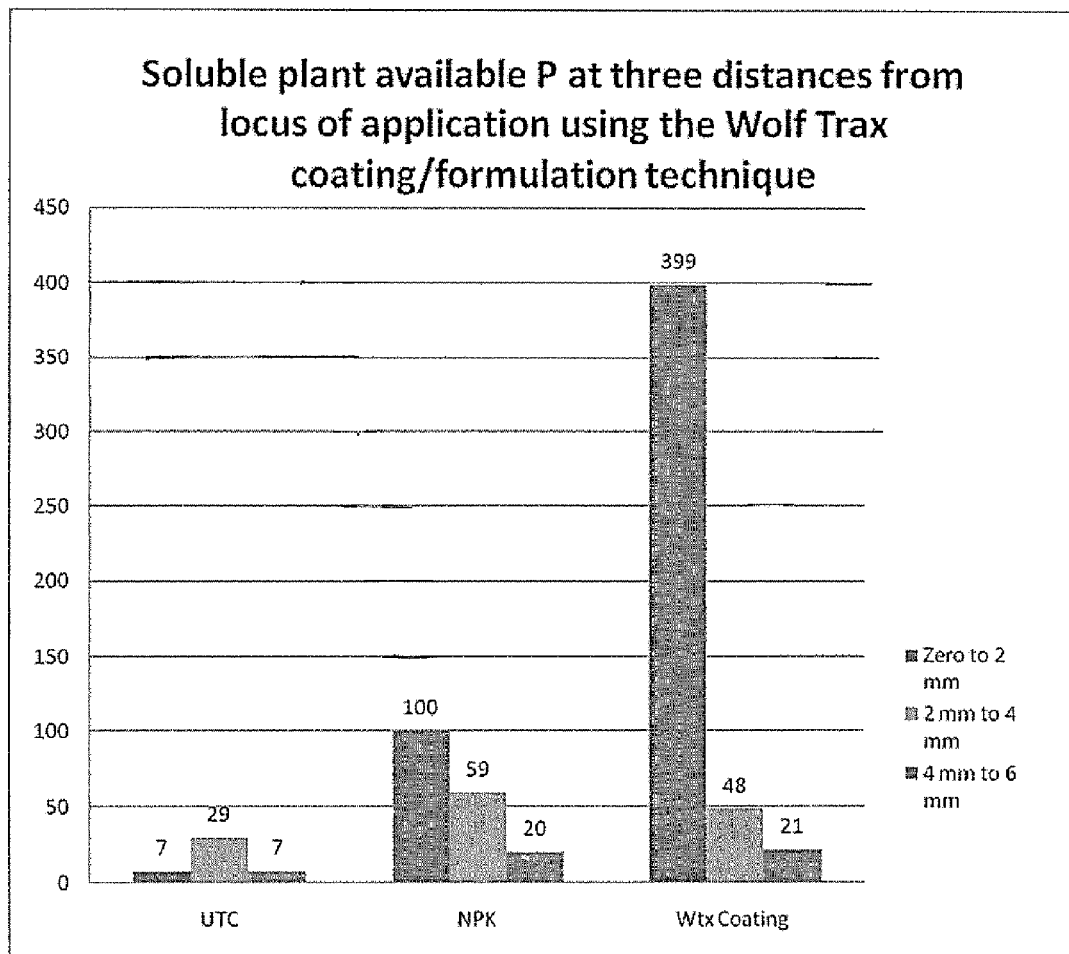
FIG. 1 is a graph showing soluble plant available phosphorus at three distances from locus of application.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As discussed herein, the inventor has discovered that the efficiency of applied phosphorus can be improved by applying phosphorus as a coating onto plant growth (roots and shoots) or by applying phosphorus as a coating on prills or granules of other forms of fertilizers. Specifically, as discussed herein, a composition comprising ground phosphorous, a sulphate source and optionally an acidic surfactant is applied.

The phosphorus source is ground into particle sizes that are sufficiently small to pass through a 150 mesh screen.

Although any suitable phosphorus source can be used, in a preferred embodiment the composition comprises 30 to 40 percent monoammonium phosphate, 30 to 40 percent struvite and 25 to 35 percent magnesium sulphate. The composition may include 1-4% acidic surfactant. The composition may include 1-3% drying agent, for example, a silica-based drying agent. While not wishing to be bound to a particular theory or hypothesis, the inventor believes that the first two ingredients ensure that there is a source of rapidly available phosphorus (MAP) and a source of more slowly available phosphorus (STRUV). The third ingredient is to provide a source of sulphate which will, in the area surrounding the coated product following application thereof to the soil, act to stop ambient calcium from reacting with the phosphate and rendering it inactive.

The sulphate source, for example, magnesium sulphate or ammonium sulphate is combined with the phosphorus powder at a ratio of than 1 part sulphate source to 2 to 4 parts phosphorus source. Following application, the sulphate binds to calcium in the soil, thereby preventing the formation of calcium/phosphate products. As will be appreciated by one of skill in the art, other suitable calcium sources may be used as well.

An acidic surfactant may be added to a level of not more than 4 percent, for example, 1-4%. Examples of suitable acidic surfactants include but are by no means limited to those sold under the trade names Tamol® (condensation products of naphthalenesulphonic acid) and Morwet® (sulfonated aromatic polymer).

In other embodiments, a silica based drying agent is added to prevent humidity issues which may arise because of the presence of the sulphates which are humectants. In a preferred embodiment, 1-3% silica based drying agent is added to the composition.

It is of note that while the absolute amount per acre scales up and down depending on the rate of nitrogen, phosphorus, potassium or sulphate macronutrient that is added, the absolute amount per kg of the product is 20 to 30% phosphorus and 16 to 20% magnesium By adding this formula as a coating to prilled nitrogen or to granular phosphorus or potassium, we attain soluble phosphorus levels of several times those seen with an uncoated phosphorus granule following application. The level of soluble phosphorus, the duration that the soluble phosphorus is present and the enhanced distribution of the phosphorus in the soil (compared to traditional phosphorus granules) leads to better plant growth. For example, testing indicates that the phosphorus present in the formulation will remain available for 7 to 14 days after application As will be appreciated by one of skill in the art, the enhanced distribution increases the likelihood that a seedling will encounter soluble phosphate sooner rather than later. Accordingly, such seedlings will show enhanced phosphate uptake and improved growth compared to similar uncoated products, that is, compared to a prill, fertilizer granule, seed or other such product that is substantially identical to the coated product except for the presence of the coating.

The coating can be applied at any suitable percentage, for example, between about 0.1% to about 2.0% (w/w). The coating may be applied using any suitable means known if in the art. In some embodiments, the coating is applied with suitable oil.

In high pH soil, the phosphorus that is typically applied is inexorably converted to a bound calcium form. In lower pH soil, the phosphorus applied is typically locked into iron or aluminum complexes. Both calcium and Fe/Al render the P unavailable.

As can be seen in FIG. 1, the soluble phosphorus preparation results in approximately four times as much phosphorus being available compared to traditional NPK pellets. The availability of P in relatively small microzones around the area of application is highly significant, especially with immobile nutrients such as P. As will be appreciated by one of skill in the art, being able to improve P availability in 2 mm zones is highly significant and very beneficial to plant growth.

Figure 5:
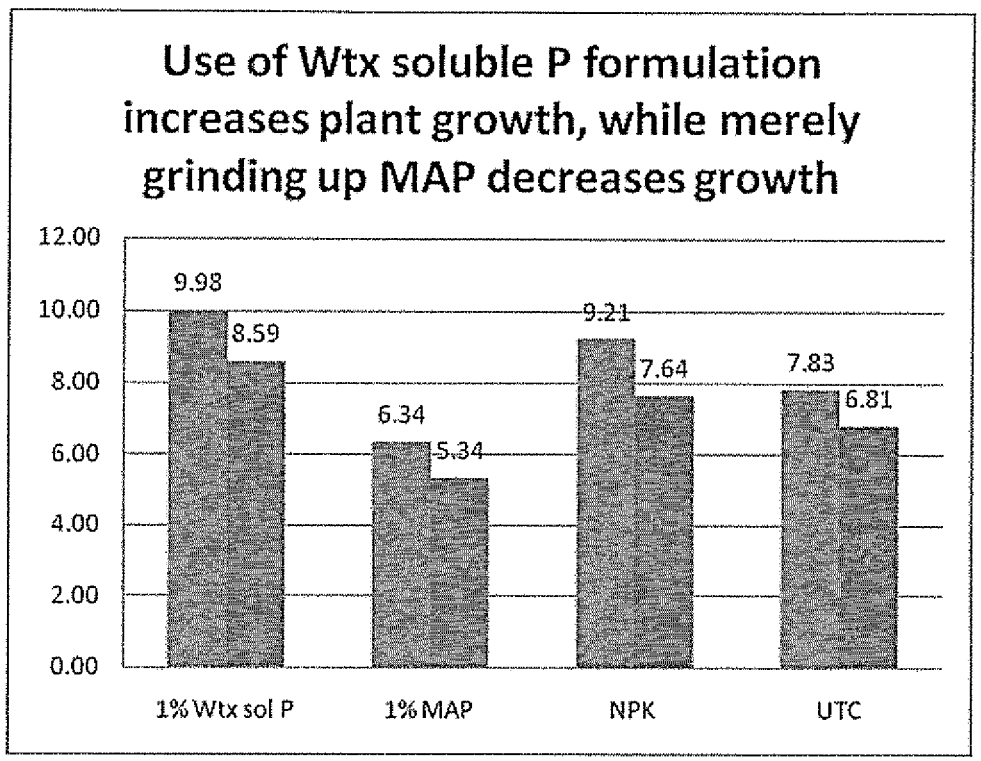
FIG. 5 is a graph showing how the soluble phosphorus formulation increased plant growth while ground MAP decreased growth.

As shown in FIGS. 1 and 5, merely grinding up the most commonly used P sources (e g monoammonium phosphate) led to decreases in plant growth (corn). Specifically, simply grinding up MAP (the usual P used in agriculture in many markets) resulted in a coating that, when applied and used as a fertilizer, caused crop injury. This may have been due to a salt effect of some kind. This was overcome by lowering the MAP content of the P ultimately formulated and by supplementing that missing P with P that was less injurious (struvite or rock phosphate).

We also noted in the course of developing the invention that other common sources of P led to poor handling characteristics. Alternative formulations included substituting calcium phosphate combinations for the MAP. This led to hydroscopicity, hardening of the powder over time and poor coating characteristics. Thus we discarded mix ratios with calcium phosphate and narrowed the specifications to those arrived at in the formulation noted above.

Regarding FIG. 5, the inventor believes that merely grinding up MAP and coating NPK prills leads to the opposite effect as seen with the instant composition, specifically, less early growth. While not wishing to be bound to a particular theory or hypothesis, the inventor believes that this is possibly because of either (a) volatilization issues or subsequent injury to seedlings or (b) initially low access of the crop seedlings to the underlying urea prill. It is however clear that this does not occur unless MAP is formulated with the other ingredients described above. It is further noted that an 8 to 15 percent increase in crop growth arises from coating the NP or K granule or prill versus crop growth attained when using the NPK alone.

Figure 2:
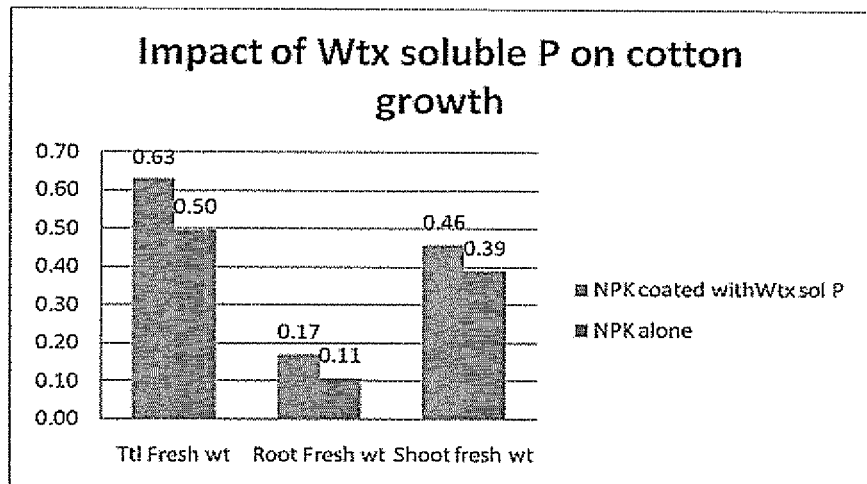
FIG. 2 is a graph showing the impact of soluble phosphorus on cotton growth.
Figure 3:
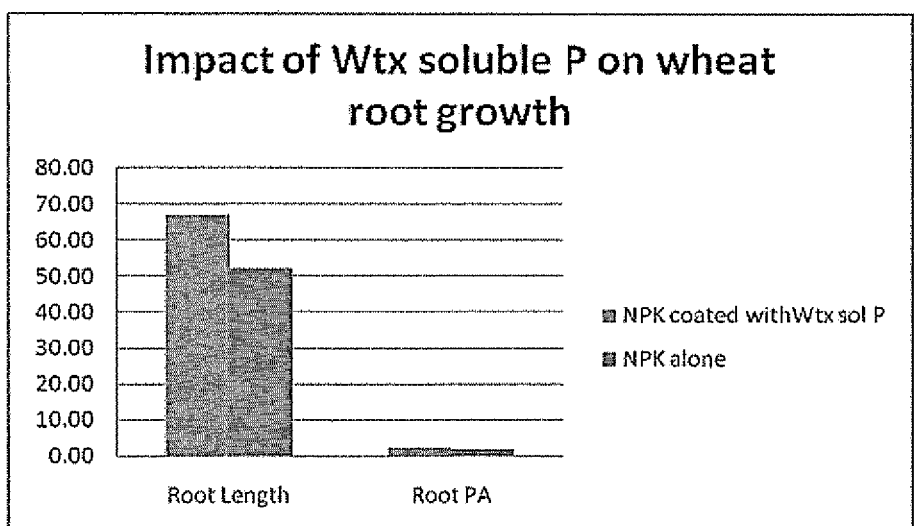
FIG. 3 is a graph showing the impact of soluble phosphorus on wheat root growth.
Figure 4:
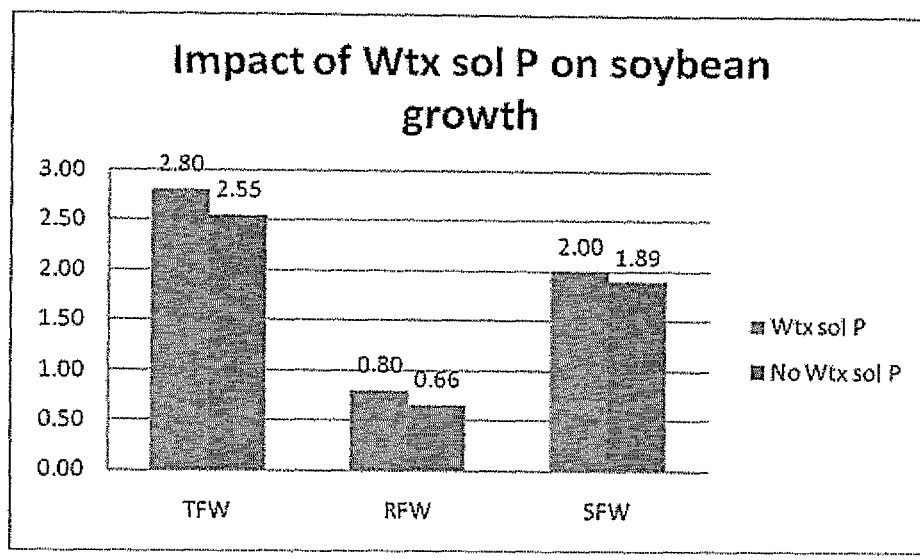
FIG. 4 is a graph showing the impact of soluble phosphorus on soybean growth.

As can be seen in FIGS. 2-4, application of the phosphorus powder improved growth in cotton, wheat and soybean.

While the preferred embodiments of the invention have been described above, it will be recognized and understood that various modifications may be made therein, and the appended claims are intended to cover all such modifications which may fall within the spirit and scope of the invention.

The invention claimed is:

1. A composition comprising 30-40% monoammonium phosphate, 30-40% struvite and 25-35% magnesium sulphate.

2. The composition according to claim 1 further including an acidic surfactant.

3. The composition according to claim 1 further including a drying agent.

4. The composition according to claim 3 wherein the drying agent is a silica-based drying agent.

5. The composition according to claim 2 further including 1-4% acidic surfactant.

6. The composition according to claim 5 further including 1-3% drying agent.

7. The composition according to claim 6 wherein the drying agent is a silica-based drying agent.

8. The composition according to claim 1 wherein the monoammonium phosphate and the struvite are in the form of ground particles smaller than 150 mesh.

9. A coated product comprising a seed, prill or fertilizer granule coated with the composition according to claim 1 at 0.1-2.0% (w/w).

10. A method of improving plant growth comprising:
applying a composition comprising monoammonium phosphate, struvite and magnesium sulphate to a seed, prill or fertilizer granule, thereby producing a coated product; and
applying the coated product to soil,
wherein the coated product results in improved growth of a plant grown in said soil due to increased phosphorous uptake by said plant compared to the growth of a similar plant supplied by an uncoated seed, prill or fertilizer granule.

11. The method according to claim 10 wherein the composition further includes an acidic surfactant.

12. The method according to claim 10 wherein the composition further includes a drying agent.

13. The method according to claim 12 wherein the drying agent is a silica-based drying agent.

14. The method according to claim 10 wherein the composition comprises 1-2 parts phosphorus per 1 part sulphate.

15. The method according to claim 10 wherein the composition comprises 30-40% monoammonium phosphate, 30-40% struvite and 25-35% magnesium sulphate.

16. The method according to claim 15 wherein the composition further includes 1-4% acidic surfactant.

17. The method according to claim 16 wherein the composition further includes 1-3% drying agent.

18. The method according to claim 17 wherein the drying agent is a silica-based drying agent.

19. The method according to claim 10 wherein the monoammonium phosphate and the struvite are in the form of ground particles smaller than 150 mesh.

20. The method according to claim 10 wherein the composition is applied to the seed, prill or fertilizer granule at 0.1-2.0% (w/w).

* * * * *